US012676265B2

(12) United States Patent
Yoshii et al.

(10) Patent No.: US 12,676,265 B2
(45) Date of Patent: Jul. 7, 2026

(54) SOLID-STATE ELECTROLYTIC CAPACITOR ELEMENT AND SOLID-STATE ELECTROLYTIC CAPACITOR

(71) Applicant: Panasonic Intellectual Property Management Co., Ltd., Osaka (JP)

(72) Inventors: Takahiro Yoshii, Osaka (JP); Kei Hirota, Okayama (JP); Hiromi Ozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 18/699,305

(22) PCT Filed: Sep. 15, 2022

(86) PCT No.: PCT/JP2022/034551
§ 371 (c)(1),
(2) Date: Apr. 8, 2024

(87) PCT Pub. No.: WO2023/074172
PCT Pub. Date: May 4, 2023

(65) Prior Publication Data

US 2024/0412926 A1     Dec. 12, 2024

(30) Foreign Application Priority Data

Oct. 26, 2021     (JP) ................................. 2021-174959

(51) Int. Cl.
  *H01G 9/02*        (2006.01)
  *H01G 9/028*       (2006.01)
  (Continued)

(52) U.S. Cl.
  CPC .............. *H01G 9/028* (2013.01); *H01G 9/10* (2013.01); *H01G 9/15* (2013.01)

(58) Field of Classification Search
None
See application file for complete search history.

(56) References Cited

U.S. PATENT DOCUMENTS 7,292,432 B2 * 11/2007 Furuzawa ................ H01G 9/10
                                          29/25.03
2008/0222862 A1 * 9/2008 Iwasa ..................... H01G 9/028
                                          29/25.03
(Continued)

FOREIGN PATENT DOCUMENTS

CN        110071328 A  *  7/2019  ............. H01G 11/56
CN        112908695 A  *  6/2021  ............. H01G 4/008
(Continued)

OTHER PUBLICATIONS

WO 2021113223 Machine Translation (Year: 2021).*
(Continued)

*Primary Examiner* — Dion R. Ferguson
(74) *Attorney, Agent, or Firm* — WHDA, LLP

(57)        ABSTRACT

A solid electrolytic capacitor includes a solid electrolytic capacitor element and an exterior body that seals the solid electrolytic capacitor element. The solid electrolytic capacitor element includes an anode body including a first end part and a second end part that is disposed opposite to the first end part, a dielectric layer covering at least a part of the anode body, and a cathode part covering at least a part of the dielectric layer. The at least a part of the dielectric layer is disposed on a portion of the anode body that is closer to the second end part than to the first end part. The cathode part includes a solid electrolyte layer covering the at least a part of the dielectric layer. A breaking strength of the solid electrolyte layer is 0.55 MPa or more and 45.00 MPa or less.

6 Claims, 2 Drawing Sheets

(51) Int. Cl.
   *H01G 9/10*      (2006.01)
   *H01G 9/15*      (2006.01)

(56)                References Cited

U.S. PATENT DOCUMENTS

| | | | | |
|---|---|---|---|---|
| 2010/0271757 | A1* | 10/2010 | Ishikawa ................ | H01G 9/028 |
| | | | | 427/487 |
| 2012/0231346 | A1* | 9/2012 | Tsujii ...................... | H01M 4/13 |
| | | | | 29/25.03 |
| 2020/0118765 | A1* | 4/2020 | Tanaka ..................... | H01G 9/15 |
| 2020/0328031 | A1* | 10/2020 | Wu ......................... | H01G 4/008 |
| 2022/0415581 | A1* | 12/2022 | Umahashi .............. | H01G 9/028 |
| 2024/0412926 | A1* | 12/2024 | Yoshii .................... | H01G 9/012 |

FOREIGN PATENT DOCUMENTS

| | | | | | |
|---|---|---|---|---|---|
| CN | 114824479 | A | * | 7/2022 | ........ H01M 10/0567 |
| JP | 2010-278423 | | | 12/2010 | |
| JP | 2011-216795 | | | 10/2011 | |
| JP | 2012-049574 | | | 3/2012 | |
| WO | WO-2008044546 | A1 | * | 4/2008 | ............ H01G 11/56 |
| WO | 2012/144477 | | | 10/2012 | |
| WO | WO-2012144477 | A1 | * | 10/2012 | ........... H01M 4/137 |
| WO | 2021/132223 | | | 7/2021 | |
| WO | WO-2021132223 | A1 | * | 7/2021 | .............. H01G 9/15 |

OTHER PUBLICATIONS

WO 2012144477 Machine Translation (Year: 2012).*
International Search Report of PCT application No. PCT/JP2022/
034551 dated Dec. 13, 2022.

* cited by examiner

SOLID-STATE ELECTROLYTIC CAPACITOR ELEMENT AND SOLID-STATE ELECTROLYTIC CAPACITOR

TECHNICAL FIELD

The present disclosure relates to a solid electrolytic capacitor element and a solid electrolytic capacitor.

BACKGROUND

A solid electrolytic capacitor includes, for example, a solid electrolytic capacitor element, an exterior body that seals the solid electrolytic capacitor element, and an external electrode electrically connected to the solid electrolytic capacitor element. The solid electrolytic capacitor element includes an anode body, a dielectric layer formed on a surface of the anode body, and a cathode part that covers at least a part of the dielectric layer. The cathode part includes a solid electrolyte layer containing a conductive polymer that covers the at least a part of the dielectric layer.

Unexamined Japanese Patent Publication No. 2010-278423 discloses a solid electrolytic capacitor including an anode, a dielectric layer provided on a surface of the anode, a first conductive polymer layer provided on the dielectric layer, a second conductive polymer layer provided on the first conductive polymer layer, a third conductive polymer layer provided on the second conductive polymer layer, and a cathode layer provided on the third conductive polymer layer. In the solid electrolytic capacitor, the first conductive polymer layer includes a conductive polymer film formed by polymerizing pyrrole or a derivative thereof, the second conductive polymer layer includes a conductive polymer film formed by polymerizing thiophene or a derivative thereof, and the third conductive polymer layer includes a conductive polymer film formed by polymerizing pyrrole or a derivative thereof.

SUMMARY

An aspect of the present disclosure relates to a solid electrolytic capacitor element. The solid electrolytic capacitor element includes: an anode body including a first end part and a second end part that is disposed opposite to the first end part; a dielectric layer covering at least a part of the anode body; and a cathode part covering at least a part of the dielectric layer. The at least a part of the dielectric layer is disposed on a portion of the anode body that is closer to the second end part than to the first end part. The cathode part includes a solid electrolyte layer covering the at least a part of the dielectric layer. A breaking strength of the solid electrolyte layer is 0.55 MPa or more and 45.00 MPa or less.

Another aspect of the present disclosure relates to a solid electrolytic capacitor. The solid electrolytic capacitor includes: the solid electrolytic capacitor element described above; and an exterior body that seals the solid electrolytic capacitor element.

Advantageous Effect of Invention

In the solid electrolytic capacitor, a leakage current can be reduced.

DESCRIPTION OF EMBODIMENT

Figure 1:
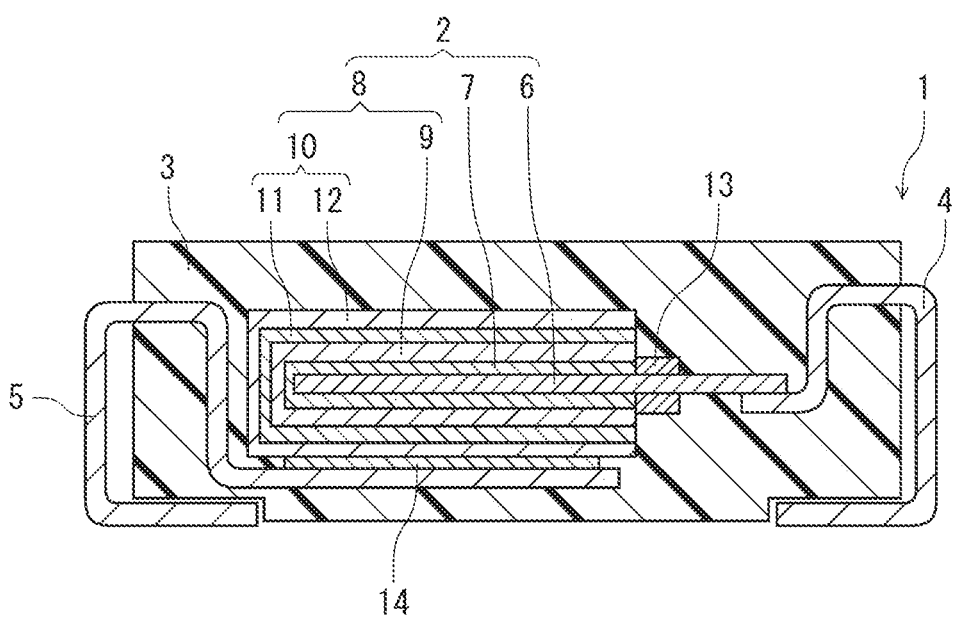
FIG. 1 is a schematic cross-sectional view illustrating a solid electrolytic capacitor according to an exemplary embodiment of the present disclosure.

In a solid electrolytic capacitor, a solid electrolytic capacitor element is usually sealed with an exterior body or the like. When sealing is performed, a resin composition provided around the solid electrolytic capacitor element may be molded into a predetermined shape, or the resin composition may be injected between the solid electrolytic capacitor and the exterior body to be solidified. In such a case, stress is applied to the solid electrolytic capacitor element at the time of sealing, so that cracks may occur in the solid electrolyte layer, the dielectric layer may be damaged, and a leakage current may be generated.

Although novel features of the present invention are set forth in the appended claims, the present invention will be better understood by the following detailed description with the drawings, taken in conjunction with other objects and features of the present invention, both as to construction and content.

The solid electrolytic capacitor element is sealed with an exterior body. In the case of using a resin exterior body, for example, a solid electrolytic capacitor element is enclosed with a resin composition, and the resin composition is subjected to compression molding or heating to cure the resin composition, whereby solid electrolytic capacitor element is sealed with the resin exterior body. Furthermore, a space between the solid electrolytic capacitor element and the exterior body may be filled with a resin composition and solidified to seal the solid electrolytic capacitor element. Therefore, stress due to molding, curing, filling, or solidification of the resin composition is applied to the solid electrolytic capacitor element. The present inventors have found that a stress at the time of sealing is applied to the solid electrolyte layer to generate a crack and a leakage current. The leakage current is considered to be caused by damage to the dielectric layer when a crack occurs in the solid electrolyte layer.

In view of the above, (1) a solid electrolytic capacitor element according to one aspect of the present disclosure includes: an anode body including a first end part and a second end part that is disposed opposite to the first end part; a dielectric layer covering at least a part of the anode body; and a cathode part covering at least a part of the dielectric layer. The at least a part of the dielectric layer is disposed on a portion of the anode body that is closer to the second end part than to the first end part. The cathode part includes a solid electrolyte layer covering the at least part of the dielectric layer. A breaking strength of the solid electrolyte layer is 0.55 MPa or more and 45.00 MPa or less.

In the present disclosure, since the breaking strength of the solid electrolyte layer is in the above-mentioned range, even when stress is applied to the solid electrolyte layer at the time of sealing the solid electrolytic capacitor element with the exterior body, occurrence of cracks can be reduced. Therefore, damage to the dielectric layer is reduced. As a result, a leakage current in the solid electrolytic capacitor can be reduced. Furthermore, an increase in the leakage current due to sealing can be suppressed to a low level.

(2) In the above-described configuration (1), a thickness of the solid electrolyte layer may have a minimum value of 1 μm or more.

(3) In the above-described configuration (1) or (2), a ratio $t_n/t_c$ of $t_n$ to $t_c$ may be 0.5 or more and 1.8 or less, where $t_n$ represents an average value of thicknesses of the solid electrolyte layer in the second end part, and $t_c$ represents an average value of thicknesses of the solid electrolyte layer in a center part of the solid electrolyte layer that is located at a center in a direction parallel to a direction from the first end part toward the second end part.

(4) In any one of the above-described configurations (1) to (3), the solid electrolyte layer may contain a conjugated polymer, a dopant, and a water-soluble polymer.

(5) The present disclosure also includes a solid electrolytic capacitor including the solid electrolytic capacitor element according to any one of the above-described figurations (1) to (4), and an exterior body that seals the solid electrolytic capacitor element. In such a solid electrolytic capacitor, since the breaking strength of the solid electrolyte layer is high, cracks generated by stress when sealing the solid electrolytic capacitor element are reduced, and damage to the dielectric layer is reduced, so that a leakage current is reduced. Furthermore, an increase in the leakage current due to sealing can be suppressed to a low level.

(6) In the above-described configuration (5), the exterior body may contain a resin.

(7) In the above-described configuration (5) or (6), the solid electrolytic capacitor may include a stacked body of two or more solid electrolytic capacitor elements.

Hereinafter, the solid electrolytic capacitor element and the solid electrolytic capacitor of the present disclosure including the above-described (1) to (7) will be described more specifically for each component with reference to the drawings as necessary. To the extent that there is no technical contradiction, at least one of the above-described (1) to (7) and at least one of the following elements may be combined. The solid electrolytic capacitor element may be simply referred to below as a capacitor element.

[Capacitor Element]

(Anode Body)

An anode body included in the capacitor element can include a valve metal, an alloy including a valve metal, a compound including a valve metal, and the like. The anode body may contain one kind of these materials, or may contain two or more kinds in combination. Preferably available examples of the valve metal include aluminum, tantalum, niobium, and titanium.

The anode body may have a porous part at least in a surface layer. The anode body having a porous surface layer is obtained by, for example, roughening a surface of a base material (sheet-like (for example, a foil shape or a plate shape) base material, etc.) containing a valve metal by etching or the like. The roughening can be performed by, for example, an etching treatment or the like. Furthermore, the anode body may be a molded body of particles that contain the valve metal or a sintered body of the molded body. Note that, in each of the molded body and the sintered body, the entire anode body has a porous structure. Each of the molded body and the sintered body may have a sheet shape, a rectangular parallelepiped shape, a cube shape, a shape similar thereto, or the like. In a case where the anode body has a sheet shape, the dielectric layer is more likely to be damaged by stress than a case where the anode body is a molded body or a sintered body. Even in such a case, according to the present disclosure, since the breaking strength of the solid electrolyte layer is within the above-described range, an increase in leakage current can be suppressed to a low level.

The anode body includes a first end part and a second end part that is disposed opposite to the first end part. The cathode part is formed on a portion of the anode body with the dielectric layer interposed therebetween. The portion of the anode body is closer to the second end part than to the first end part. The portion of the anode body is closer to the second end part than to the first end part, on which the cathode part is formed, may be referred to as a cathode formation part. The cathode formation part includes the second end part. A portion of the anode body is closer to the first end part than to the second end part, on which the cathode part is not formed, may be referred to as an anode lead-out part. The anode lead-out part includes the first end part. An anode lead terminal is connected to the anode lead-out part.

(Dielectric Layer)

The dielectric layer is formed so as to cover at least a part of the anode body. The dielectric layer is an insulating layer that functions as a dielectric. The dielectric layer is formed by anodizing the valve metal of the surface of the anode body by anodizing treatment or the like. In the dielectric layer formed on the surface of the anode body having the porous part, a surface of the dielectric layer has a fine uneven shape according to a shape of a surface of the porous part.

The dielectric layer may be formed of a material that functions as a dielectric layer. The dielectric layer includes, for example, an oxide of a valve metal as such a material. For example, in a case where tantalum is used as the valve metal, the dielectric layer contains $Ta_2O_5$, and in a case where aluminum is used as the valve metal, the dielectric layer contains $Al_2O_3$. However, the dielectric layer is not limited to these specific examples.

(Cathode Part)

The cathode part includes at least a solid electrolyte layer covering at least a part of the dielectric layer. The solid electrolyte layer is formed on a portion of the anode body with the dielectric layer interposed therebetween. The portion of the anode body is closer to the second end part than to the first end part. The cathode part usually includes a solid electrolyte layer and a cathode lead-out layer covering at least a part of the solid electrolyte layer. Hereinafter, the solid electrolyte layer and the cathode lead-out layer will be described.

(Solid Electrolyte Layer)

The solid electrolyte layer contains a conductive polymer. The conductive polymer includes a conjugated polymer and a dopant, for example. The solid electrolyte layer may further contain an additive agent as necessary.

Examples of the conjugated polymer include known conjugated polymers used in solid electrolytic capacitors, such as x-conjugated polymers. Examples of the conjugated polymer include polymers having polypyrrole, polythiophene, polyaniline, polyfuran, polyacetylene, polyphenylene, polyphenylene vinylene, polyacene, and polythiophene vinylene as a basic skeleton. Among these polymers, a polymer that adopts polypyrrole, polythiophene, or polyaniline as a basic skeleton is preferable. The polymer is required to contain at least one kind of monomer unit constituting the basic skeleton. The monomer unit also includes a monomer unit having a substituent. The polymer also includes a homopolymer, and a copolymer of two or more kinds of monomer. For example, polythiophene includes poly (3,4-ethylenedioxythiophene) and the like.

Among the conjugated polymers, a conjugated polymer containing a monomer unit corresponding to at least one kind selected from the group consisting of a pyrrole compound, a thiophene compound, and an aniline compound is preferable. Examples of the pyrrole compound include a compound having a pyrrole ring and capable of forming a repeated structure of a corresponding monomer unit. Examples of the thiophene compound include a compound having a thiophene ring and capable of forming a repeated structure of a corresponding monomer unit. These compounds can be linked at the 2-position and 5-position of the pyrrole ring or the thiophene ring to form the repeated structure of the monomer unit. Examples of the aniline compound include a compound having a benzene ring and at least one (preferably one) amino group bonded to the benzene ring and capable of forming a repeated structure of a corresponding monomer unit. The aniline compound can be linked to, for example, an amino group at a CH group (a CH group constituting a benzene ring) moiety at the p-position with respect to the amino group to form the repeated structure of the monomer unit.

The pyrrole compound may have, for example, a substituent at at least one of the 3- and 4-positions of the pyrrole ring. The thiophene compound may have a substituent at at least one of the 3- and 4-positions of the thiophene ring, for example. The substituent at the 3-position and the substituent at the 4-position may be linked to form a ring fused to a pyrrole ring or a thiophene ring. Examples of the pyrrole compound include pyrrole that may have a substituent at at least one of the 3- and 4-positions. Examples of the thiophene compound include thiophene which may have a substituent at at least one of the 3- and 4-positions and an alkylene dioxythiophene compound ($C_{2-4}$ alkylenedioxythiophene compounds such as ethylenedioxythiophene compounds, and the like). The alkylene dioxythiophene compound also includes those having a substituent in a part of an alkylene group. Examples of the aniline compound include an aniline optionally having a substituent at at least one of the o- and p-positions with respect to an amino group.

The substituent is preferably, but is not limited to, an alkyl group ($C_{1-4}$ alkyl groups such as methyl group and ethyl group, and the like), an alkoxy group ($C_{1-4}$ alkoxy groups such as methoxy group and ethoxy group, and the like), a hydroxy group, a hydroxyalkyl group (a hydroxy $C_{1-4}$ alkyl group such as a hydroxymethyl group, and the like), or the like. In a case where each of the pyrrole compound, thiophene compound, and aniline compound has two or more substituents, the respective substituents may be identical to or different from each other.

A conjugated polymer containing at least a monomer unit corresponding to pyrrole, or a conjugated polymer (such as PEDOT) containing at least a monomer unit corresponding to a 3,4-ethylenedioxythiophene compound (such as 3,4-ethylenedioxythiophene (EDOT)) may be used. The conjugated polymer including at least a monomer unit corresponding to pyrrole may include only a monomer unit corresponding to pyrrole, or may include a monomer unit corresponding to a pyrrole compound other than pyrrole (pyrrole having a substituent, etc.) in addition to the monomer unit. The conjugated polymer including at least a monomer unit corresponding to EDOT may include only a monomer unit corresponding to EDOT, or may include a monomer unit corresponding to a thiophene compound other than EDOT in addition to the monomer unit.

The solid electrolyte layer may contain one kind of conjugated polymer, or may contain two or more kinds thereof in combination.

The conjugated polymer has a weight-average molecular weight (Mw) that is not particularly limited, and that is, for example, 1,000 or more and 1,000,000 or less.

Note that the weight-average molecular weight (Mw) herein is a value in terms of polystyrene measured by gel permeation chromatography (GPC). Note that the GPC is typically measured using a polystyrene gel column, and water and methanol (volume ratio: 8/2) as a mobile phase.

Examples of the dopant include at least one kind selected from a group consisting of an anion and a polyanion.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include benzenesulfonic acid, p-toluenesulfonic acid and naphthalenesulfonic acid.

Examples of the polyanion include a polymer anion. The solid electrolyte layer may contain, for example, a conjugated polymer including a monomer unit corresponding to a thiophene compound and a polymer anion.

Examples of the polymer anion include polymers having a plurality of anionic groups. Examples of such a polymer include a polymer including a monomer unit having an anionic group. Examples of the anionic group include a sulfonic acid group and a carboxy group. The polymer anion preferably has at least a sulfonic acid group.

In the solid electrolyte layer, the anionic group of the dopant may be contained in a free form, an anion form, or a salt form, or may be contained in a form bonded or interacting with the conjugated polymer. In the present description, all of these forms may be simply referred to as an "anionic group", a "sulfonic acid group", or a "carboxy group", etc.

Examples of the polymer anion having a sulfonate group include a polymer-type polysulfonic acid. Specific examples of the polymer anion include polyvinylsulfonic acid, polystyrenesulfonic acid (including a copolymer and a substitute having a substituent), polyallylsulfonic acid, polyacrylsulfonic acid, polymethacrylsulfonic acid, poly (2-acrylamide-2-methylpropanesulfonic acid), polyisoprenesulfonic acid, polyestersulfonic acid (aromatic polyester sulfonic acid and the like), and phenolsulfonic acid novolak resin. However, the polymer anion is not limited to these specific examples.

An amount of the dopant contained in the solid electrolyte layer may be, for example, 10 parts by mass or more and 1000 parts by mass or less, 20 parts by mass or more and 500 parts by mass or less, or 50 parts by mass or more and 200 parts by mass or less with respect to 100 parts by mass of the conjugated polymer.

The solid electrolyte layer may be a single layer or may be formed of a plurality of layers. In a case where the solid electrolyte layer is formed of the plurality of layers, conductive polymers contained in the respective layers may be identical or different. Furthermore, dopants included in the respective layers may be identical or different. A layer for improving adhesion may be interposed between the dielectric layer and the solid electrolyte layer.

Examples of the additive agent include a known additive (for example, a coupling agent and a silane compound) added to the solid electrolyte layer, a known conductive material other than the conductive polymer, and a water-soluble polymer. The solid electrolyte layer (or each layer constituting the solid electrolyte layer) may contain one of these additive agents, or may contain a combination of two or more thereof. In a case where the solid electrolyte layer is formed of a plurality of layers, the additive agents contained in each layer may be the same or different.

Examples of the conductive material as the additive agent include at least one kind selected from a group consisting of conductive inorganic materials such as manganese dioxide and TCNQ complex salts.

Examples of the water-soluble polymer include water-soluble polymer compounds having a hydrophilic group in a main chain or a side chain. The dopant of a polymer-type is also contained in a water-soluble polymer. Examples of the hydrophilic group of the water-soluble polymer include a polyoxyalkylene chain, a hydroxy group, and an acid group (carboxy group, sulfonic acid group, etc.). As the water-soluble polymer, a component having lower electron withdrawing properties than the dopant is typically used. Examples of such a water-soluble polymer include a water-soluble polymer having at least one kind selected from a group consisting of a carboxy group, a hydroxy group, and a polyoxyalkylene chain. A water-soluble polymer containing no sulfonic acid group may be used. Examples of the polyoxyalkylene chain include a polyoxy $C_{2-3}$ alkylene chain. The polyoxyalkylene chain may contain at least a polyoxyethylene chain. Examples of the water-soluble polymer include at least one kind selected from a group consisting of a polyalkylene glycol compound, a water-soluble polyurethane, a water-soluble polyamide, a water-soluble polyimide, a water-soluble acrylic resin, and polyvinyl alcohol. The water-soluble polymer preferably has at least a plurality of carboxy groups. Examples of such a water-soluble polymer include a polymer-type polycarboxylic acid, a resin into which a plurality of carboxy groups are introduced (water-soluble polyurethane resin, water-soluble polyamide, water-soluble polyimide, water-soluble acrylic resin, and the like), and the like. When the water-soluble polymer is used, the breaking strength of the solid electrolyte layer is increased, and it is easy to increase the thickness of the solid electrolyte layer or to reduce variations in the thickness. Therefore, the effect of reducing the leakage current is further enhanced. Furthermore, it is also advantageous in enhancing pressure resistance. From such a viewpoint, in a case where the solid electrolyte layer is formed of a plurality of layers, the second layer preferably contains a water-soluble polymer. The first layer may or may not contain the water-soluble polymer.

The water-soluble acrylic resin also includes, for example, an acrylic polymer-type polycarboxylic acid. Examples of such a polymer-type polycarboxylic acid include a copolymer (an acrylic acid-methacrylic acid copolymer, a copolymer of at least one selected from the group consisting of acrylic acid and methacrylic acid and another copolymerizable monomer, and the like) using at least one of polyacrylic acid, polymethacrylic acid, acrylic acid, and methacrylic acid. As other copolymerizable monomers, for example, an acrylic acid ester (an alkyl ester, a hydroxyalkyl ester or the like), a methacrylic acid ester (an alkyl ester, a hydroxyalkyl ester, or the like), a vinyl compound (vinyl cyanide, olefin, an aromatic vinyl compound or the like), a polycarboxylic acid having a polymerizable unsaturated bond (a maleic acid, a fumaric acid or the like), and acid anhydrides of these materials can be named. The copolymer may include one kind or two or more kinds of monomer units derived from other copolymerizable monomers.

Each of the carboxy group and the sulfonic acid group of the water-soluble polymer may be contained in the solid electrolyte layer (or each layer constituting the solid electrolyte layer) in a free form, an anion form, or a salt form as in the case of the dopant. Furthermore, a part of each of the carboxy group and the sulfonic acid group may be contained in the solid electrolyte layer (or each layer constituting the solid electrolyte layer) in a form of being bonded to or interacting with the conjugated polymer. The carboxy group in all these forms herein may be simply referred to as a "carboxy group", and the sulfonic acid group in all these forms herein may be simply referred to as a "sulfonic acid group".

The Mw of the water-soluble polymer is, for example, 100 or more and 5 million or less (or 1 million or less), and may be 400 or more and 5 million or less (or 1 million or less).

The content of the water-soluble polymer in the solid electrolyte layer is, for example, 10 mass % or more and 70 mass % or less, may be 25 mass % or more and 70 mass % or less, or may be 30 mass % or more and 70 mass % or less. In a case where the content of the water-soluble polymer in the solid electrolyte layer is in such a range, the breaking strength of the solid electrolyte layer is more easily increased, and the effect of reducing the leakage current is enhanced.

Note that the content of the water-soluble polymer in the solid electrolyte layer can be determined using a sample (Hereinafter, referred to as sample A.) of the solid electrolyte layer collected from a cross section of a sample for measuring the breaking strength described later. More specifically, the solid electrolyte layer is scraped from the cross section, a predetermined amount of sample A is collected, and the mass is measured. A water-soluble polymer is extracted from sample A with water at 20° C. to 40° C. The extract is concentrated and the water-soluble polymer is identified by liquid chromatography mass spectrometry (LC-MS) or gas chromatography mass spectrometry (GC-MS). The concentration of the water-soluble polymer in the extract is obtained by a calibration curve method. From this concentration and the mass of sample A, the content (mass) of the water-soluble polymer in the solid electrolyte layer is determined.

In the present disclosure, the breaking strength of the solid electrolyte layer is 0.55 MPa or more. Since the solid electrolyte layer has such a high breaking strength, even when stress is generated at the time of sealing the capacitor element with the exterior body, the occurrence of cracks in the solid electrolyte layer can be reduced, and the leakage current can be kept low. From the viewpoint of further enhancing the effect of reducing the leakage current in the solid electrolytic capacitor, the breaking strength of the solid electrolyte layer may be 0.59 MPa or more. The breaking strength of the solid electrolyte layer is 45.00 MPa or less. In this case, the stress is easily dispersed in a case where the anode lead-out parts of the plurality of capacitor elements are bundled. The breaking strength of the solid electrolyte layer may be 15.00 MPa or less, 5.00 MPa or less, or 2.00 MPa or less. In a case where the breaking strength is in such a range, a high dispersion effect of stress can be easily obtained, and the leakage current can be further suppressed. These lower limit value and upper limit value can be arbitrarily combined. The breaking strength of the solid electrolyte layer may be, for example, 0.55 MPa or more and 45.00 MPa or less (or 15.00 MPa or less), or 0.55 MPa or more and 5.00 MPa or less (or 2.00 MPa or less).

The solid electrolyte layer having the breaking strength as described above is formed by electrolytic polymerization. By adjusting the conditions of the electrolytic polymerization, a dense and more uniform solid electrolyte layer is formed, and high breaking strength can be secured.

The breaking strength is measured by a nanoindentation method in accordance with ISO 14577 using a sample in which a cross section of the solid electrolyte layer is exposed. For the measurement, a nanoindenter (for example, TI950 Triboindenter manufactured by Hyditron Corporation) is used. More specifically, in the cross section of the solid electrolyte layer of the sample, the diamond indenter is pushed in the indenter mode of the nanoindenter, and the strength when the solid electrolyte layer breaks is measured. The measurement is performed at 20 points, and the median is obtained. This median value is defined as the breaking strength of the solid electrolyte layer. A sample for measurement is prepared by embedding a solid electrolytic capacitor in an acrylic resin, cutting the solid electrolytic capacitor in a direction parallel to the length direction at the center of the capacitor element in the width direction to expose a cross section, and polishing the cross section. When the breaking strength of the solid electrolyte layer in the state of the capacitor element is determined, a sample for measurement is prepared in the same manner as described above except that the capacitor element is used instead of the solid electrolytic capacitor.

The length direction of the capacitor element is a direction parallel to the direction from the first end part toward the second end part of the anode body. The direction from the first end part toward the second end part of the anode body is also referred to as a length direction of the anode body. The direction from the first end part toward the second end part of the anode body is a direction connecting the center of the end surface at the side of the first end part and the center of the end surface at the side of the second end part of the anode body in a state where the anode body is not bent. The length direction of the capacitor element is parallel to the length direction of the cathode part or the solid electrolyte layer. The width direction of the capacitor element is parallel to the width direction of the cathode part or the solid electrolyte. The width direction of the capacitor element is a direction perpendicular to both the length direction and the thickness direction of the capacitor element (or the stacking direction of layers constituting the capacitor element).

Generally, examples of the index of the strength or hardness of the resin molded article include tensile strength, flexural strength, indentation hardness, scratch hardness, and repulsion hardness. In the present disclosure, the leakage current in the solid electrolytic capacitor tends to increase according to the degree of occurrence of cracks in the solid electrolyte layer. In hardness (indentation hardness, scratch hardness, and the like), a trace when a predetermined pressure is applied is evaluated (In other words, the degree of deformation in the range of plastic deformation is evaluated), and thus the correlation with a crack generated beyond the range of plastic deformation is low. Tensile strength or flexural strength is hardly related to stress applied to the solid electrolyte layer in the manufacturing process of the solid electrolytic capacitor. On the other hand, in the evaluation of the breaking strength, it is considered to be easy to reproduce the influence similar to the stress applied to the solid electrolyte layer in the manufacturing process of the solid electrolytic capacitor. Therefore, it is considered that the breaking strength of the solid electrolyte layer has a high correlation with the occurrence of cracks in the solid electrolyte layer.

In the present disclosure, the minimum value of the thickness of the solid electrolyte layer is, for example, 1 μm or more, and may be 1.3 μm or more. In a case where the minimum value of the thickness is in such a range, the rigidity of the solid electrolyte layer is improved, and damage to the dielectric layer can be further reduced. Therefore, the effect of reducing the occurrence of cracks is enhanced. From the viewpoint of further reducing the occurrence of cracks, the minimum value of the thickness of the solid electrolyte layer is preferably 5 μm or more, more preferably 8 μm or more, or 8.9 μm or more. From the viewpoint of securing a high capacity, the minimum value of the thickness of the solid electrolyte layer is, for example, 20 μm or less.

The solid electrolyte layer may have a first portion disposed in voids of the porous portion of the anode body having the dielectric layer, and a second portion disposed outside from a principal surface of the anode body having the dielectric layer. In this case, the minimum value of the thickness of the solid electrolyte layer is the minimum value of the thickness of the second portion.

The thickness of the solid electrolyte layer is measured using a cross-sectional image of a sample prepared in the same procedure as the sample for measuring the breaking strength. More specifically, in the cross-sectional image of the solid electrolyte layer of the sample, the distance from the principal surface of the anode body having the dielectric layer to the surface (in other words, the interface between the solid electrolyte layer and the cathode lead-out layer) of the solid electrolyte layer is measured as the thickness of the solid electrolyte layer. The thickness of the solid electrolyte layer is measured at a plurality of arbitrary points (for example, five locations), and the minimum value of these measured values is defined as the minimum value of the thickness of the solid electrolyte layer. The cross-sectional image of the sample is taken using, for example, a scanning electron microscope (SEM).

In general, the solid electrolyte layer is formed by chemical polymerization or electrolytic polymerization, or formed using a liquid composition containing a conductive polymer. In the case of polymerization, it is difficult to control polymerization conditions, and the thickness of the solid electrolyte layer tends to vary. In a case where a liquid composition containing a conductive polymer is used, the dopant and the conjugated polymer contained in the liquid composition have a high molecular weight, the liquid composition is a dispersion, or application and drying of the liquid composition need to be repeated a plurality of times, so that the thickness of the solid electrolyte layer tends to vary. By the method for forming a solid electrolyte layer, in the vicinity of the end part of the solid electrolyte layer on the side of the first end part of the anode body or in the vicinity of the end part of the solid electrolyte layer on the side of the second end part of the anode body, the thickness of the solid electrolyte layer tends to be smaller than the thickness of the solid electrolyte layer in the center part in the length direction of the cathode part.

In the present disclosure, a dense solid electrolyte layer is formed by adjusting conditions of electrolytic polymerization and the like in order to increase breaking strength. Therefore, the variation in the thickness of the solid electrolyte layer is reduced, and the thickness of the solid electrolyte layer can be made relatively large even in the vicinity of the end part. Therefore, when the capacitor element is sealed with the exterior body, concentration of stress on a portion having a small thickness of the solid electrolyte layer is suppressed, stress is dispersed throughout the solid electrolyte layer, and stress is easily relaxed. As a result, durability of the solid electrolyte layer is improved, and generation of cracks is further suppressed. Since damage to the dielectric layer can be further reduced, the effect of reducing the leakage current is further enhanced.

The average value of the thicknesses of the solid electrolyte layer in the second end part is represented by $t_n$, and the average value of the thicknesses of the solid electrolyte layer in the center part of the solid electrolyte layer that is located at a center in the length direction is represented by $t_c$. At this time, a ratio $t_n/t_c$ of $t_n$ to $t_c$ may be, for example, 0.5 or more, 0.75 or more, 0.9 or more, or 0.97 or more. The ratio $t_n/t_c$ is, for example, 1.8 or less, preferably 1.5 or less. In a case where the ratio $t_n/t_c$ is in such a range, high durability against stress applied to the solid electrolyte layer is easily obtained, and the effect of suppressing an increase in leakage current in the solid electrolytic capacitor is enhanced. These lower limit value and upper limit value can be arbitrarily combined. The ratio $t_n/t_c$ may be, for example, 0.5 or more (or 0.75 or more) and 1.8 or less, or 0.5 or more (or 0.75 or more) and 1.5 or less.

Each of the thicknesses $t_n$ and $t_c$ of the solid electrolyte layer is determined according to the case of the thickness of the solid electrolyte layer described above using a cross-sectional image of a sample prepared in the same procedure as the sample for measuring breaking strength. The thickness $t_n$ in the second end part is determined by measuring and averaging, at a plurality of locations (for example, five locations), the thickness of the solid electrolyte layer formed in a portion from the end surface at the side of the second end part of the anode body to a distance of 0.9 mm from the end surface. The thickness $t_c$ in the center part is determined by measuring and averaging the thickness of the solid electrolyte layer formed on the principal surface of the anode body at a plurality of points (for example, five locations) in a portion between a position of 0.9 mm from the center of the solid electrolyte layer toward the first end part and a position of 0.9 mm from the center of the solid electrolyte layer toward the second end part in the length direction. In a case where the solid electrolytic capacitor includes a plurality of capacitor elements, $t_n$ and $t_c$ are determined by measuring the thicknesses of the solid electrolyte layers in the second end part and in the center part of each of the plurality of capacitor elements at a plurality of locations in the same manner as described above, and averaging the thicknesses for all the capacitor elements.

Note that, in a case where the solid electrolyte layer has the first portion and the second portion, at least one of the compositions and the film qualities of the solid electrolyte layers in the first portion and the second portion may be different from each other, or both the compositions and the film qualities may be the same. In a case where the solid electrolyte layer is composed of a plurality of layers, the first portion may be the first layer and the second portion may be the second layer. In this case, at least one of the compositions and the film qualities in the first layer and the second layer may be different from each other, or both the compositions and the film qualities may be the same.

The electrolytic polymerization of the solid electrolyte layer can be performed by applying a polymerization voltage in a state where the anode foil having the dielectric layer is in contact with (for example, immersion) a polymerization liquid (liquid composition) containing a precursor of a conductive polymer. The polymerization voltage is applied through the power feeder. The anode body is usually provided with an insulating region in a predetermined region between the first end part and the second end part from the viewpoint of securing insulation between the cathode part and the anode lead-out part. The insulating region is formed by, for example, attaching an insulating tape to the surface of the anode body, impregnating the porous portion with an insulating material (insulating resin or the like), or combining these. The power feeder is connected to such an insulating region, and a polymerization voltage is applied thereto.

The liquid composition contains the precursor of the conductive polymer. The precursor of the conductive polymer includes at least a precursor of the conjugated polymer, and includes the dopant as necessary. Examples of the precursor of the conjugated polymer include a raw material monomer of the conjugated polymer, and an oligomer and a prepolymer in which a plurality of molecular chains of the raw material monomer are linked. One kind of precursor may be used, or two or more kinds of precursor may be used in combination. From the viewpoint of easily obtaining higher orientation of the conjugated polymer and easily forming a dense solid electrolyte layer, it is preferable to use at least one selected from the group consisting of monomers and oligomers (in particular, monomers) as the precursor.

The liquid composition typically contains a solvent. Examples of the solvent include at least one kind selected from a group consisting of water and an organic solvent.

In a case where a dopant, another conductive material, an additive agent, and the like are used, they may be added to the liquid composition. By adjusting the concentration of the dopant in the liquid composition, the orientation of the conjugated polymer in the solid electrolyte layer is easily enhanced, and a dense solid electrolyte layer is easily obtained. When the liquid composition containing the water-soluble polymer is used as the additive agent, it is advantageous in further reducing the leakage current because the breaking strength can be increased and the variation in the thickness of the solid electrolyte layer can be reduced. Prior to the electrolytic polymerization, a precoat layer containing the conductive material may be formed on a surface of the dielectric layer.

At least one of the Mw of the water-soluble polymer to be used and the concentration of the water-soluble polymer in the liquid composition may be adjusted. In this case, it is considered that the viscosity of the liquid mixture is moderately increased by the water-soluble polymer, the electrolytic polymerization slowly proceeds to obtain a dense solid electrolyte layer, and the strength is increased by the water-soluble polymer itself existing like a skeleton supporting the polymerized membrane in the solid electrolyte layer.

The concentration of the water-soluble polymer in the liquid composition may be, for example, 1% by mass or more and 30% by mass or less, 1.5% by mass or more and 15% by mass or less, or 2% by mass or more and 15% by mass or less (or 10% by mass or less). In a case where the concentration of the water-soluble polymer is in such a range, it is easy to obtain higher breaking strength of the solid electrolyte layer, and it is easy to reduce the variation in the thickness of the solid electrolyte layer.

The liquid composition may contain an oxidizing agent as necessary. Furthermore, the oxidizing agent may be applied to the anode foil including the dielectric layer before or after the liquid composition is brought into contact with the anode foil. Examples of such an oxidizing agent include a compound capable of generating $Fe^{3+}$ (such as a ferric sulfate), a persulfate (such as a sodium persulfate or an ammonium persulfate), and a hydrogen peroxide. The oxidizing agent may be used with one kind thereof or two or more kinds thereof in combination.

In the electrolytic polymerization, the polymerization voltage is preferably less than 0.90 V, and more preferably 0.87 V or less or 0.85 V or less. In a case where the polymerization voltage is in such a range, the polymerization proceeds slowly, the orientation of the conjugated polymer easily increases, and a dense solid electrolyte layer is easily formed. Therefore, it is easy to secure high breaking strength. The polymerization voltage may be 0.6 V or more.

The polymerization voltage is a potential of the power feeder with respect to the reference electrode (silver/silver chloride electrode (Ag/Ag$^+$)).

Electrolytic polymerization may be performed by a two-pole method using an anode body having a dielectric layer formed on a surface thereof as an anode and two electrodes of the anode and a counter electrode, but is preferably performed by a three-pole method. The three-pole electrolytic polymerization is performed using an anode body having a dielectric layer formed on a surface thereof as an anode and three electrodes of the anode, a counter electrode, and a reference electrode. During the tripolar electrolytic polymerization, by using the reference electrode, the potential of the anode can be precisely controlled without being affected by a change in the natural potential of the counter electrode. In the case of the tripolar type, since the electrolytic polymerization reaction is more precisely controlled than in the case of the bipolar type, the orientation of the conjugated polymer formed by the electrolytic polymerization is enhanced, and a denser solid electrolyte layer is formed. Therefore, it is advantageous in increasing the breaking strength. Furthermore, it is easy to reduce variations in the thickness of the solid electrolyte layer.

Tripolar electrolytic polymerization is performed in a state in which the anode body, the counter electrode, and the reference electrode are immersed in the liquid composition. As the counter electrode, for example, a Ti electrode is used, but the counter electrode is not limited thereto. As the reference electrode, it is preferable to use a silver/silver chloride electrode (Ag/Ag$^+$).

The electrolytic polymerization may be performed at a temperature in a range from 5° C. to 60° C., inclusive, or in a range from 15° C. to 35° C., inclusive, for example.

(Cathode Lead-Out Layer)

The cathode lead-out layer may include at least a third layer that is in contact with the solid electrolyte layer and covers at least a part of the solid electrolyte layer, and may include a third layer and a fourth layer covering the third layer. Examples of the third layer include a layer containing conductive particles and a metal foil. Examples of the conductive particles include at least one kind selected from conductive carbon and metal powder. For example, the cathode lead-out layer may include a layer containing conductive carbon (also referred to as a carbon layer) as the third layer and a metal-containing layer (for example, a layer containing metal powder or a metal foil) as the fourth layer. In a case where a metal foil is used as the third layer, the cathode lead-out layer may be formed of the metal foil.

Examples of the conductive carbon include graphite (artificial graphite, natural graphite, and the like).

The layer containing metal powder as the fourth layer can be formed, for example, by laminating a composition containing metal powder on the surface of the third layer. Examples of such a fourth layer include a metal paste layer formed using a composition containing metal powder such as silver particles and a resin (binder resin). Although a thermoplastic resin is available for the resin, use of a thermosetting resin such as an imide resin or an epoxy resin is preferable.

In a case where a metal foil is used as the third layer, the type of metal is not particularly limited. The metal foil is preferably formed using a valve metal such as aluminum, tantalum, or niobium, or an alloy containing the valve metal. The metal foil has a surface that may be roughened as necessary. The surface of the metal foil may be provided with an anodization film, and may be provided with a film of metal (dissimilar metal) different from the metal constituting the metal foil, or a nonmetal film. Examples of the different type of metal and nonmetal include metals such as titanium and nonmetals such as carbon (conductive carbon or the like).

The coating film of the dissimilar metal or nonmetal (for example, conductive carbon) may be used as the third layer, and the metal foil may be used as the fourth layer (Separator)

In a case where the metal foil is used for the cathode lead-out layer, a separator may be disposed between the metal foil and the anode foil. The separator is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The capacitor element may be, for example, a wound type, a stacked type, or a chip type. The capacitor element may have a configuration selected suitable for the type of the solid electrolytic capacitor.

[Solid Electrolytic Capacitor]

A solid electrolytic capacitor includes at least one capacitor element and an exterior body that seals the capacitor element. The solid electrolytic capacitor may include a plurality of capacitor elements. The solid electrolytic capacitor may be a wound type, or may be either a chip type or a stacked type.

The capacitor element includes the cathode lead-out layer to which one end part of a cathode lead terminal is electrically connected. The first part of the anode foil is electrically connected to one end part of an anode lead terminal. The other end part of the anode lead terminal and the other end part of the cathode lead terminal are drawn out from the exterior body. The other end part of each lead terminal exposed from the exterior body is used for solder connection or the like with a substrate on which the solid electrolytic capacitor is to be mounted. As each lead terminal, a lead wire may be used, or a lead frame may be used.

The exterior body may be a resin exterior body or other exterior bodies. A resin composition may be injected between the exterior body and the capacitor element and solidified to seal the capacitor element. In a case where the resin composition is injected and solidified by the resin exterior body or between the exterior body and the capacitor element to seal the capacitor element, stress is applied to the capacitor element, and cracks are likely to occur in the solid electrolyte layer. In the present disclosure, even in such a case, since the breaking strength of the solid electrolyte layer is high, the occurrence of cracks is reduced, and the leakage current can be kept low.

The solid electrolytic capacitor may include, for example, a stacked body of two or more capacitor elements. In the stacked body, the anode lead-out parts of the respective capacitor elements are connected to the lead terminals in a bundled state. When the anode lead-out part is bundled in a state where the plurality of capacitor elements are stacked, stress generated by the bundling is applied to the vicinity of the end part on the side of the first end part of the solid electrolyte layer. Therefore, in the vicinity of the end part on the side of the first end part of the solid electrolyte layer, cracks are likely to occur, and damage to the dielectric layer is also likely to occur. When the stacked body of the capacitor element in this state is sealed with the exterior body, cracks increase, and damage to the dielectric layer tends to increase, so that a leakage current tends to increase in the solid electrolytic capacitor. In the present disclosure, even in such a case, occurrence of cracks is reduced because the breaking strength of the solid electrolyte layer of each capacitor element is high. Therefore, the leakage current can be effectively reduced.

The stacked body includes, for example, two or more capacitor elements. When the number of capacitor elements increases, stress is likely to be applied to the vicinity the end part on the side of the first end part of the solid electrolyte layer. Even in such a case, according to the present disclosure, the leakage current in the solid electrolytic capacitor can be kept low.

The capacitor element is sealed using an exterior body. In a case where the resin exterior body is used, for example, the capacitor element and a material resin (for example, a resin composition containing an uncured thermosetting resin and a filler) of the exterior body may be housed in a mold, and the capacitor element may be sealed with the resin exterior body by a transfer molding method, a compression molding method, or the like. At this time, a portion of the other end part of the anode lead terminal and a portion of the other end part of the cathode lead terminal, which are drawn out from the capacitor element, are respectively exposed from the mold. Furthermore, the capacitor element may be housed in an exterior body, and a resin material (for example, a resin composition containing an uncured thermosetting resin and a filler) may be injected and solidified between the exterior body and the capacitor element. For example, a solid electrolytic capacitor may be formed by housing a capacitor element in a bottomed case such that a portion of the other end part of the anode lead terminal and a portion of the other end part of the cathode lead terminal are positioned on an opening side of the bottomed case, injecting a resin material into the case, sealing the opening of the bottomed case with a sealing body, and solidifying the resin material.

FIG. 1 is a cross-sectional view schematically illustrating a structure of a solid electrolytic capacitor according to one exemplary embodiment of the present disclosure. FIG. 1 is a schematic cross-sectional view illustrating a solid electrolytic capacitor in a direction parallel to both a length direction and a thickness direction of capacitor element 2. As illustrated in FIG. 1, solid electrolytic capacitor 1 includes capacitor element 2, resin exterior body 3 that seals capacitor element 2, and anode lead terminal 4 and cathode lead terminal 5 that are each at least partially exposed to an outside of resin exterior body 3. Anode lead terminal 4 and cathode lead terminal 5 can be made of metal such as copper or a copper alloy, for example. Resin exterior body 3 has a substantially rectangular parallelepiped outer shape, and solid electrolytic capacitor 1 also has a substantially rectangular parallelepiped outer shape.

Capacitor element 2 includes anode body 6, dielectric layer 7 covering anode body 6, and cathode part 8 covering dielectric layer 7. Cathode part 8 includes solid electrolyte layer 9 covering dielectric layer 7, and cathode lead-out layer 10 covering solid electrolyte layer 9. Cathode lead-out layer 10 includes carbon layer 11 as a third layer covering solid electrolyte layer 9, and metal-containing layer 12 as a fourth layer covering carbon layer 11. In the present disclosure, solid electrolyte layer 9 has high breaking strength, so that occurrence of cracks in solid electrolyte layer 9 can be reduced and damage to the dielectric layer can be reduced even when stress is applied at the time of sealing capacitor element 2 with resin exterior body 3. Therefore, the leakage current can be suppressed low.

Anode body 6 includes a region facing cathode part 8 and a region not facing cathode part 8. In a region of anode body 6 not opposed to cathode part 8, insulating separation part (insulating region) 13 is formed in a portion adjacent to cathode part 8 so as to cover a surface of anode body 6 in a band shape, thereby restricting contact between cathode part 8 and anode body 6. In the region of anode body 6 that does not face cathode part 8, the other part is electrically connected to anode lead terminal 4 by welding. Cathode lead terminal 5 is electrically connected to cathode part 8 via adhesive layer 14 formed of a conductive adhesive.

Figure 2:
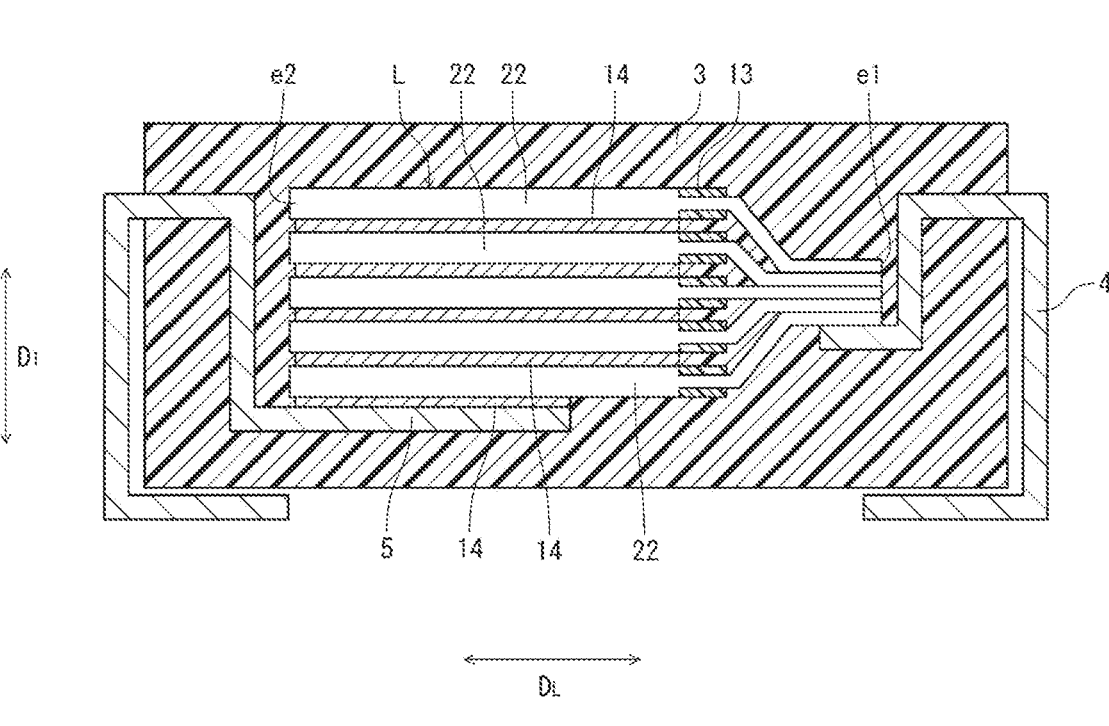
FIG. 2 is a schematic cross-sectional view illustrating a solid electrolytic capacitor according to another exemplary embodiment of the present disclosure.

FIG. 2 is a schematic cross-sectional view of a solid electrolytic capacitor according to another exemplary embodiment of the present disclosure. Solid electrolytic capacitor 21 includes stacked body L of a plurality of capacitor elements 22, resin exterior body 3 that seals stacked body L, and anode lead terminal 4 and cathode lead terminal 5 that are each at least partially exposed to the outside of resin exterior body 3. Note that FIG. 2 is a schematic cross-sectional view of solid electrolytic capacitor 21 in a direction parallel to length direction and thickness direction (stacking direction) $D_T$ of capacitor element 22.

In stacked body L, one first end part e1 of anode body 6 included in each capacitor element 22 is electrically connected to one end part of anode lead terminal 4 by welding in a bundled state. One end part of cathode lead terminal 5 is electrically connected to the cathode part of capacitor element 22 disposed on the outermost side (the lower end part in the drawing) of stacked body L via adhesive layer 14 formed of a conductive adhesive. A part of anode lead terminal 4 on the side of the other end part and a part of cathode lead terminal 5 on the side of the other end part are drawn out from another principal surface of resin exterior body 3 to the outside. Other configurations of FIG. 2 can be referred to the description of FIG. 1. Note that in FIG. 2, the configuration of capacitor element 22 is omitted. In a case where solid electrolytic capacitor 21 includes a stacked body of capacitor elements 22, first end parts of anode body 6 may be bundled as illustrated in FIG. 2. In this case, stress at the time of bundling is applied to the vicinity of the end part of the solid electrolyte layer of capacitor element 22 on a side of the first end part e1, and a crack is likely to occur. Even in such a case, in the present disclosure, since the breaking strength of the solid electrolyte layer is high, the occurrence of cracks can be suppressed, and the occurrence of cracks can be suppressed when stacked body L is sealed with resin exterior body 3. Therefore, an increase in leakage current can be reduced.

Note that the length direction of anode body 6 or capacitor element 22 is a direction parallel to a direction from first end part e1 toward second end part e2 in a state where anode body 6 is not bent.

EXAMPLES

Hereinafter, the present invention is specifically described with reference to examples and comparative examples, but the present invention is not limited to the following examples.

<<Solid Electrolytic Capacitors E1 to E4 and R1>>

Solid electrolytic capacitors (solid electrolytic capacitors E1 to E4 and R1) including stacked body L of capacitor element 22 as illustrated in FIG. 2 were produced in the following manner, and their characteristics were evaluated. However, stacked body L was a stacked body of seven capacitor elements 22. The configuration of capacitor element 22 is the same as the configuration of capacitor element 2 in FIG. 1.

(1) Preparation of Anode Body 6

Both surfaces of an aluminum foil (thickness: 100 µm) as a base material were roughened by etching to produce anode body 6.

(2) Formation of Dielectric Layer 7

A cathode formation part of anode body 6 was immersed in an anodizing solution, and a DC voltage of 70 V was applied for 20 minutes to form dielectric layer 7 containing aluminum oxide.

(3) Formation of Solid Electrolyte Layer 9

Separation part 13 was formed by attaching an insulating resist tape between the region where the solid electrolyte layer is formed and the region where the solid electrolyte layer is not formed of anode body 6 on which dielectric layer 7 is formed. Anode body 6 on which separation part 13 is formed was immersed in a liquid composition containing a conductive material, taken out, and dried to form a precoat layer (not illustrated).

A polymerization liquid containing pyrrole (monomer of a conjugated polymer), naphthalenesulfonic acid (dopant), and water was prepared. Using the obtained polymerization liquid, electrolytic polymerization was performed in a tripolar manner. More specifically, anode body 6 on which the precoat layer is formed, the counter electrode, and the reference electrode (silver/silver chloride reference electrode) were immersed in the polymerization liquid. A voltage was applied to anode body 6 in a manner that the potential of anode body 6 with respect to the reference electrode is the value of the polymerization voltage shown in Table 1 and electrolytic polymerization was performed at 25° C. to form solid electrolyte layer 9. In the electrolytic polymerization, at least one of an area of the counter electrode and an added amount of naphthalenesulfonic acid was adjusted as necessary together with the polymerization voltage. Furthermore, in Examples, a water-soluble polymer (polymer-type polycarboxylic acid) was added to the polymerization liquid at a concentration shown in Table 1.

(4) Formation of Cathode Lead-Out Layer 10

Anode body 6 obtained in the above-described (3) was immersed in a dispersion liquid in which graphite particles are dispersed in water, taken out from the dispersion liquid, and then dried to form carbon layer 11 at least on a surface of solid electrolyte layer 9. The drying was performed at 150° C. for 30 minutes.

Next, a silver paste containing silver particles and a binder resin (epoxy resin) was applied onto the surface of carbon layer 11, and heated at 150° C. for 30 minutes to cure the binder resin, thereby forming metal-containing layer (metal paste layer) 12. Cathode lead-out layer 10 composed of carbon layer 11 and metal paste layer 12 was thus formed, and cathode part 8 composed of solid electrolyte layer 9 and cathode lead-out layer 10 was formed.

A plurality of capacitor elements 22 were produced as described above.

(5) Assembly of Solid Electrolytic Capacitor

Stacked body L was prepared by stacking 7 of capacitor elements 22 obtained in the above-described (4) with adhesive layer 14 of the conductive adhesive interposed therebetween. Cathode part 8 of capacitor element 22 disposed at the end part in the stacking direction of stacked body L and one end part of cathode lead terminal 5 were bonded to each other by adhesive layer 14 of a conductive adhesive. One end part (in other words, the end part of the anode lead-out part) of anode body 6 protruding from each capacitor element 22 of stacked body L was bundled and joined to one end part of anode lead terminal 4 by laser welding. A total of 20 such stacked bodies L were prepared.

Next, resin exterior bodies 3 made of an insulating resin were formed around the respective stacked bodies L by molding. At this time, the other end part of anode lead terminal 4 and the other end part of cathode lead terminal 5 were drawn out from resin exterior body 3.

In this way, a total of 20 solid electrolytic capacitors were completed.

[Evaluation]

The capacitor element or solid electrolytic capacitor obtained above was used to perform the following evaluation. Note that the leakage current was evaluated for the solid electrolytic capacitor, and the state in which cathode lead terminal 5 and anode lead terminal 4 were joined to capacitor element 22 obtained in the above-described (4) was evaluated in accordance with the case of the above-described (5).

(a) Breaking Strength

The breaking strength (MPa) of the solid electrolyte layer was determined by the procedure described above using the solid electrolytic capacitor.

(b) Thickness of Solid Electrolyte Layer

The minimum value of the thickness of the solid electrolyte layer and the ratio $t_n/t_c$ of the average value of the thickness of the solid electrolyte layer was determined by the procedure described above using the solid electrolytic capacitor.

(c) Leakage Current (LC)

The solid electrolytic capacitors were connected in series with a resistance of 1 kΩ, and a leakage current (initial leakage current) (µA) after applying a rated voltage of 25 V for 1 minute with a DC power supply was measured to determine an average value of 20 solid electrolytic capacitors. In the same manner as in the case of the solid electrolytic capacitor, the initial leakage current of the capacitor element was also measured, and the average value of 20 capacitor elements was obtained. These average values are shown in Table 1 below as LC of the capacitor and LC of the capacitor element, respectively.

Evaluation results are shown in Table 1. E1 to E4 are examples, and R1 is a reference example.

TABLE 1

| | Polymerization voltage (V) | Water-soluble polymer concentration (mass %) | Breaking strength (MPa) | Minimum value of thickness of solid electrolyte layer (µm) | Ratio $t_n/t_c$ | LC of capacitor element (µA) | LC of capacitor (µA) |
|---|---|---|---|---|---|---|---|
| E1 | 0.70 | 4.00 | 0.68 | 10.1 | 1.32 | 0.5 | 1.2 |
| E2 | 0.60 | 10.00 | 0.92 | 8.9 | 1.05 | 1.9 | 15.7 |
| E3 | 0.85 | 6.00 | 0.59 | 12.4 | 0.97 | 4.9 | 10.2 |
| E4 | 0.85 | 2.00 | 0.55 | 1.5 | 1.78 | 7.6 | 28.3 |
| R1 | 0.90 | 0.00 | 0.45 | 0.7 | 0.47 | 69.2 | 994.9 |

As shown in Table 1, when the breaking strength of the solid electrolyte layer is less than 0.55 MPa, the leakage current is large in both the capacitor element and the solid electrolytic capacitor. The leakage current of the capacitor element is 69.2 µA, whereas the leakage current of the solid electrolytic capacitor is 994.9 µA, which is remarkably large. This is considered to be because the capacitor element could not withstand the magnitude of the stress applied when the capacitor element was sealed by resin molding to form resin exterior body 3, so that the solid electrolyte layer was cracked, and as a result, the dielectric layer was damaged. The solid electrolytic capacitor of R1 was measured by transmission X-ray computed tomography (CT), and it was confirmed that a plurality of relatively large cracks were formed in the solid electrolyte layer. As the transmitted X-ray CT, Xradia 520 Versa manufactured by Zeiss was used.

On the other hand, in E1 to E4, the leakage current in the capacitor element was 7.6 µA or less, which was much smaller than R1, and the leakage current in the solid electrolytic capacitor was 28.3 µA or less, which was also very small. This is believed to be because the high breaking strength of the solid electrolyte layer reduced the occurrence of cracks when sealing the capacitor element with the resin exterior body, thereby reducing damage to the dielectric layer. Furthermore, the larger the minimum value of the thickness of the solid electrolyte layer or the thickness of the second portion is, the lower the leakage current in the solid electrolytic capacitor can be suppressed (comparison between R1 and E4 and E1 to E3).

Although the present invention has been described in terms of presently preferred exemplary embodiments, such disclosure should not be construed in a limiting manner. Various modifications and alterations will undoubtedly become apparent to the person of ordinary skill in the art to which the present invention belongs upon reading the above disclosure. Thus, the appended scope of claims should be construed to cover all modifications and alterations without departing from the true spirit and scope of the present invention.

The present disclosure provides a solid electrolytic capacitor element and a solid electrolytic capacitor with reduced leakage current. Thus, the solid electrolytic capacitor element and the solid electrolytic capacitor can be used for various applications in which high reliability is required.

The invention claimed is:

1. A solid electrolytic capacitor element comprising:
an anode body including a first end part and a second end part, the second end part being disposed opposite to the first end part;
a dielectric layer covering at least a part of the anode body; and
a cathode part covering at least a part of the dielectric layer, the at least a part of the dielectric layer being disposed on a portion of the anode body that is closer to the second end part than to the first end part, wherein:
the cathode part includes a solid electrolyte layer covering the at least a part of the dielectric layer,
the solid electrolyte layer contains a conjugated polymer, a dopant, and a water-soluble polymer, and
a breaking strength of the solid electrolyte layer is 0.55 MPa or more and 2.00 MPa or less, the breaking strength being measured by a nanoindentation method.

2. The solid electrolytic capacitor element according to claim 1, wherein a thickness of the solid electrolyte layer has a minimum value of 1 µm or more.

3. The solid electrolytic capacitor element according to claim 1, wherein a ratio $t_n/t_c$ of $t_n$ to $t_c$ is 0.5 or more and 1.8 or less, where $t_n$ represents an average value of thicknesses of the solid electrolyte layer in the second end part, and $t_c$ represents an average value of thicknesses of the solid electrolyte layer in a center part of the solid electrolyte layer that is located at a center in a direction parallel to a direction from the first end part toward the second end part.

4. A solid electrolytic capacitor comprising:
at least one solid electrolytic capacitor element according to claim 1; and
an exterior body that seals the solid electrolytic capacitor element.

5. The solid electrolytic capacitor according to claim 4, wherein the exterior body contains a resin.

6. The solid electrolytic capacitor according to claim 4, comprising a stacked body of two or more solid electrolytic capacitor elements including the solid electrolytic capacitor element.

* * * * *